Jan. 19, 1971 HUYGENE K. FUJIWARA 3,556,815
COLORED POPCORN PACKAGE
Filed Sept. 16, 1968 2 Sheets-Sheet 1
FIG. 1
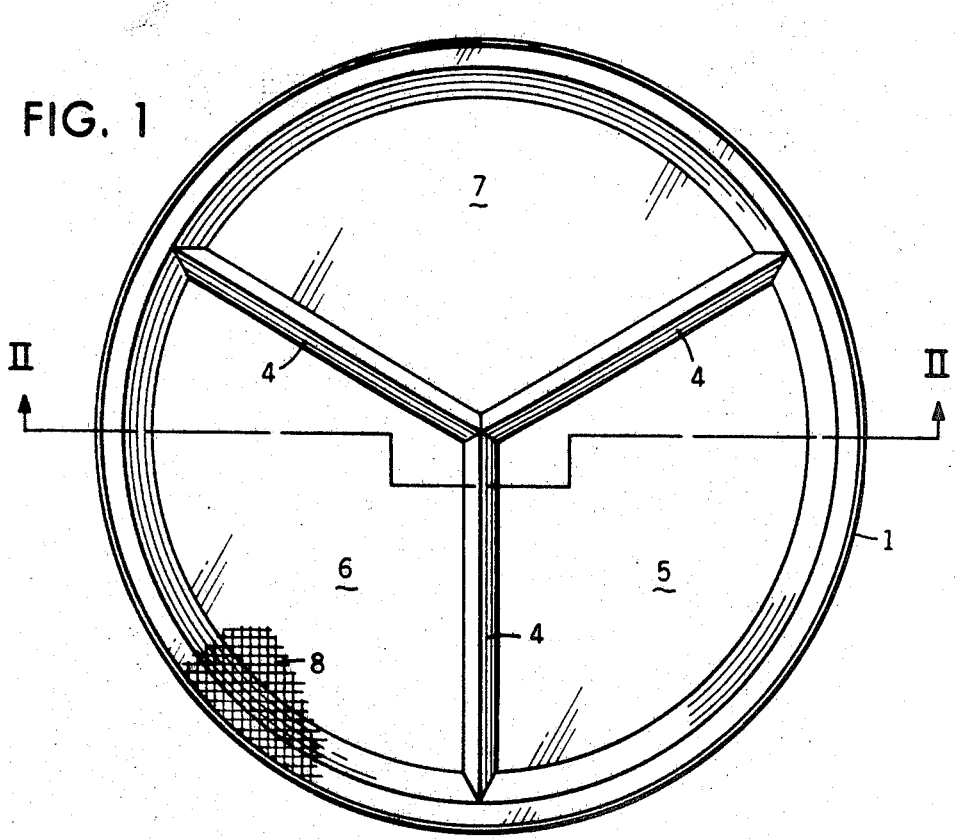
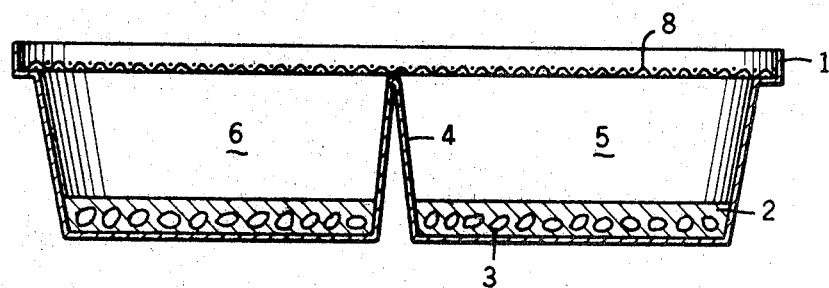
FIG. 2
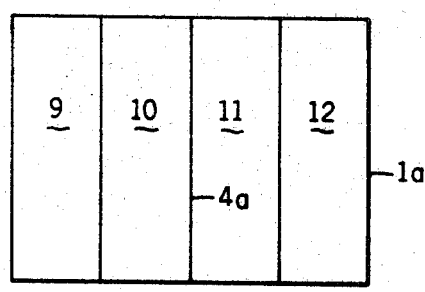
FIG. 3
INVENTOR
HUYGENE K. FUJIWARA

INVENTOR
HUYGENE K. FUJIWARA

United States Patent Office 3,556,815
Patented Jan. 19, 1971

3,556,815
COLORED POPCORN PACKAGE
Huygene K. Fujiwara, Clayton, Mo., assignor to Ralston Purina Company, St. Louis, Mo., a corporation of Missouri
Filed Sept. 16, 1968, Ser. No. 762,183
Int. Cl. B65d 81/34
U.S. Cl. 99—171                                            9 Claims

ABSTRACT OF THE DISCLOSURE

A colored popcorn premix package is disclosed which produces colored popcorn when popped. The package contains popcorn in a cake of solid fat containing a coloring agent. The pan may be divided into compartments and the fat in each compartment may contain different coloring agents. When the popcorn in the divided pan is popped several different colors of popcorn are produced. The pan may have an expansible, transparent cover to retain the popcorn as it is popped.

---

It is desirable to provide a popcorn premix product which will color popcorn kernels as the popcorn pops. The popcorn kernels should be uniformly colored to obtain a pleasing appearance and have maximum appeal for the consumer of the popcorn. The popcorn premix should be in a form which may be conveniently marketed and readily utilized by the consumer.

It is well known in the art to form a popcorn premix of solidified fat and popcorn kernels which can be packaged as a unit. The popcorn premix may be formed in a pan which is suitable for transporting the popcorn premix to the consumer and for popping the popcorn. Inventions of this type are disclosed in U.S. Pat. 2,604,407 to Martin and in U.S. Pat. 2,815,883 to Robins et al. It is known to color popcorn kernels before they are popped. This method is unsatisfactory since when the kernels are popped the color remains on the hull of the popcorn and the popped kernel is white.

This invention provides a novel popcorn premix package having a coloring agent added to the fat and popcorn in the package. The invention also provides a novel composition for a popcorn product containing unpopped popcorn, solid cooking fat, and a coloring agent. In addition, the invention provides a method of uniformly coloring the popped kernels of popcorn by adding a coloring agent to the fat of the popcorn premix.

In the drawings:

FIG. 1 is a top plan view of the divided pan containing dyed fat, and popcorn premix according to this invention.

FIG. 2 is a side cross-sectional view of FIG. 1 taken along the line II—II.

FIG. 3 is a top plan view of an alternative embodiment of this invention.

Figure 4:
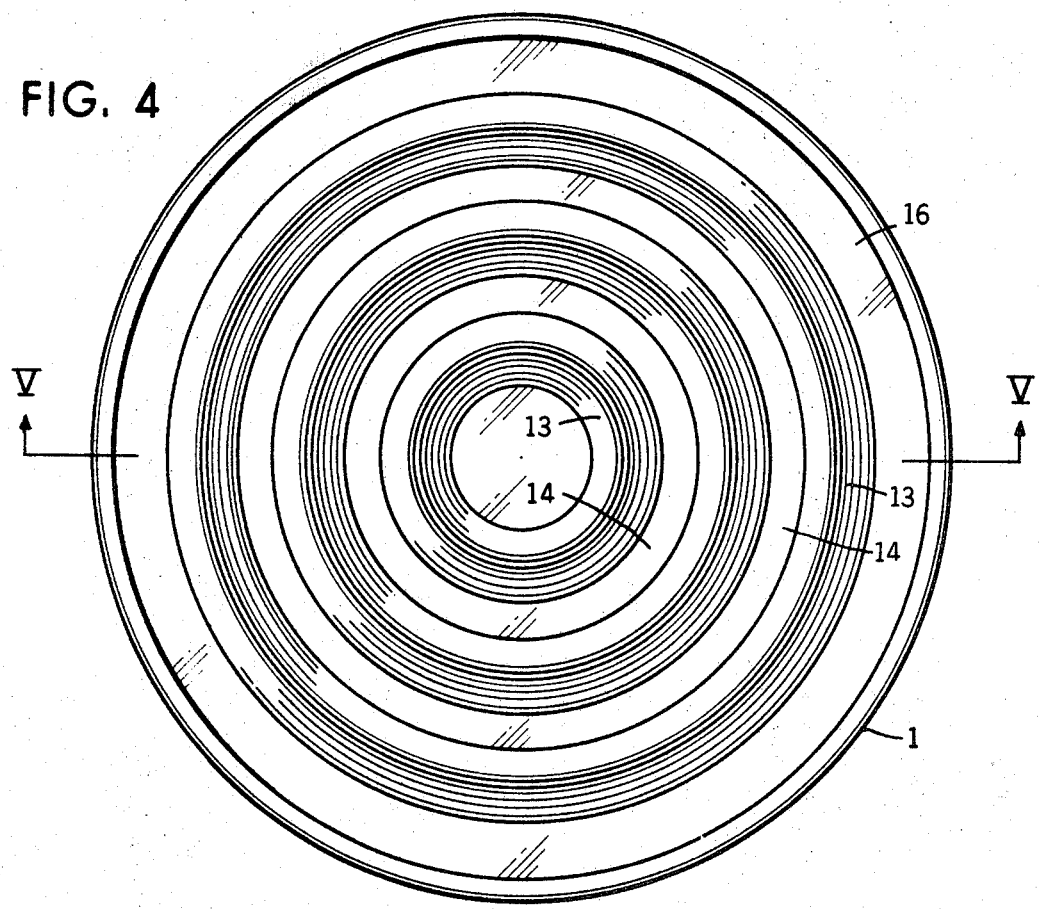
FIG. 4 is a top plan view of a novel expansible top suitable for use with the pan of FIG. 1.
Figure 5:
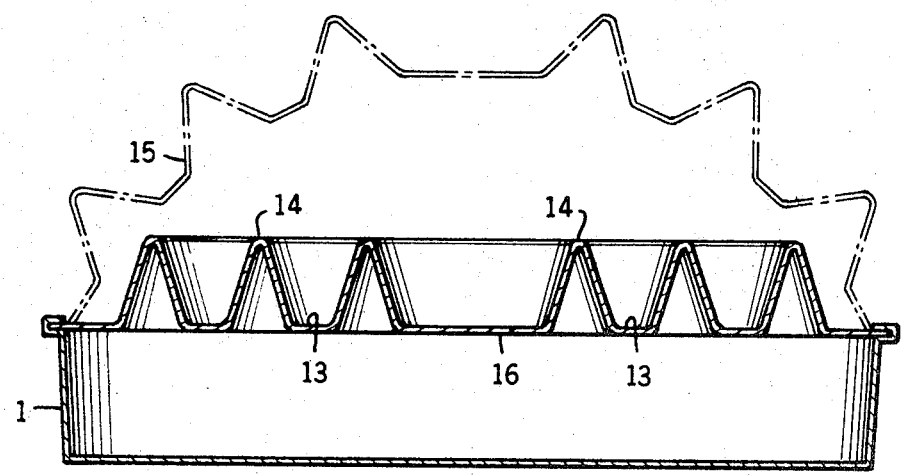
FIG. 5 is a side cross-sectional view of FIG. 4 taken along the line V—V.

Referring to the drawing in detail, 1 is a metal pan for popping corn. The pan may be provided with a cover 8. The cover may be solid or foraminous. Alternatively, the pan may be provided with an expansible cover such as the one disclosed by Robins et al. in U.S. Pat. 2,815,883. A transparent expansible cover is preferred, however, since it allows the person popping the popcorn to observe the popping operation and determine if the popcorn is sticking and burning. Also, it is entertaining, particularly for children, to observe the popping corn accept color in the manner provided by this invention. A transparent expansible cover is shown in FIG. 4. A thin sheet 16 of a flexible, transparent film is collapsed into a substantially planar body by forming a series of annular folds or corrugations 13, 14 in the surface of the sheet. The folds are concentric to the center of the sheet and to each other. The folds are compacted against each other to form a substantially planar body. When the popcorn in the pan 1 is popped the expanding popcorn and expanding gases in the pan unfold the corrugations and the sheet assumes the shape shown by line 15 in FIG. 5. The sheet 16 and corrugations 13, 14 are circular to form a cover for circular pan 1. If a cover for a rectangular pan is desired, the corrugations may be formed in a concentric rectangular pattern. Any flexible transparent film can be used to form sheet 16; polyethylene, polytetrafluoroethylene, vinyl, and cellophane are all acceptable. The cover can be formed in the shape shown by line 15 by injection molding or by forming a sheet over a hot die. After removing the cover from the mold or die the cover is collapsed to the substantially planar body shown in FIG. 5. Normally, the weight of the cover is sufficient to collapse it.

The bottom of pan 1 contains a cake of popcorn 3 and a solid cooking fat 2 containing a dispersed coloring agent. The pan may be divided into a plurality of compartments 5, 6, and 7 by partitions 4. The coloring agent in each compartment may be selected to impart a different color to the popcorn in each compartment. The pan may be round as shown in FIG. 1, or rectangular as shown in FIG. 3. A round pan is preferably divided into pie shaped compartments such as 5, 6, and 7. Rectangular pans are best divided into rectangular compartments such as 9, 10, 11, and 12.

The cake is preferably formed in the pan by placing a layer of popcorn in the compartments and adding the fat and coloring agents as a mixed liquid. The pan is then cooled to solidify the popcorn and colored fat to form a cake. The best results are obtained if just enough corn is added to cover the bottom of the compartment and if just enough fat and coloring agent are added to cover the layer of popcorn. Of course, the cake can be formed separately and added to the compartments in solid form.

Any cooking fat which is solid at room temperature may be used to form the cake, but it is preferable to use a hydrogenated vegetable fat having a melting point from slightly above room temperature to about 120° F. Fats having lower melting points are more difficult to store and transport and may impair the flavor of the popcorn by burning. Preferred fats have melting points in the range of 95° F. to 101° F. Hydrogenated cottonseed oil, peanut oil, soy oil, coconut oil, and combinations of these oils have proven to be satisfactory. A commercially available fat which provides good results may be obtained from the Durkees Famous Foods Company under the trade name Melvo. The fat has a melting point of about 98° F. and is a combination of hydrogenated vegetable oils.

A variety of coloring agents may be used to color the popcorn. The most effective coloring agents and the most satisfactory coloring agents for food products are the FD & C Lakes certified by the Color Certification Laboratory of the Food and Drug Administration. A variety of satisfactory lakes can be obtained from the Warner-Jenkinson Manufacturing Company of St. Louis, Mo. A discussion of FD & C Lakes and their uses can be found in "FD & C Lakes Can Do More For You," James E. Noonan, Food Engineering, May 1966. Coloring agents other than lakes may be used; any food color which can be dispersed to form the desired depth and uniformity of color on the popped popcorn is satisfactory. A variety of natural coloring agents provide good color on popped popcorn. Oleoresin paprika, oil soluble beta-carotene, and similar naturally occurring pigments are quite satisfactory.

The coloring agent is added directly to the liquified fat and dispersed in the fat by a mixing device. The coloring agent may also be added to an oil and mixed to form a concentrated dispersion. The concentrated dispersion may then be added to the liquefied fat and then dispersed. Salt is preferably dispersed in the cooking fat with the coloring agent. The addition of the salt to the fat unexpectedly increases the dispersibility of the coloring agent and increases the uniformity of color on the popped popcorn kernel. The mixed fat and coloring agent are added to the whole popcorn and allowed to harden to form a cake of popcorn fat premix. The proportion of coloring agent added to the fat is sufficient to produce the desired depth of color on the popped corn. The composition of the formed cake will ordinarily be:

|  | Percent |
|---|---|
| Fat | 45–75 |
| Coloring agent | .01–.325 |
| Salt | 0.5–2 |
| Popcorn | Balance |
|  | 100 |

The proportions are measured in percent by weight. Actually, the amount of coloring agent can be increased above the limits set here. However, this is not good practice. The Food and Drug Administration recommends that actual dye strength in food products be less than 300 parts per million. The actual dye strength of all coloring agents, e.g., lakes, is not always 100%. It is preferable to choose proportions of coloring agents which will follow the Food and Drug Administration recommended practice.

If a divided pan is used, such as the pan of FIG. 1, more than one color of popcorn can be obtained. For example, the divided pan of FIG. 1 may have compartments containing cakes colored with the primary colors red, blue, and yellow.

The composition of the red cake may be:

|  | Percent |
|---|---|
| Fat | 45.00 |
| Salt | .50 |
| FD & C Red Lake | .01 |
| Popcorn | Balance |
|  | 100.00 |

The composition of the blue cake may be:

|  | Percent |
|---|---|
| Fat | 47.00 |
| Salt | .70 |
| FD & C Blue Lake | .10 |
| Popcorn | Balance |
|  | 100.00 |

The composition of the yellow cake may be:

|  | Percent |
|---|---|
| Fat | 50.00 |
| Salt | 1.00 |
| FD & C Yellow Lake | .15 |
| Popcorn | Balance |
|  | 100.00 |

When the divided pan of popcorn pops, kernels having the colors red, blue, yellow, orange, green, indigo, and violet are produced. In addition, some kernels are colored several colors. Other combinations of colors can be obtained by varying the color in the compartment or by using pans having additional compartments. A four compartment pan such as the pan shown in FIG. 3 may be used. The cakes in compartments 9, 10, 11, and 12 may each contain a white, green, brown or orange coloring agent.

A complete package consisting of the pan and popcorn-fat cake is compact, easy to store and transport, and provides a convenient ready to pop unit. To pop the popcorn, simply place the package over medium heat and heat with occasional shaking until the popping is complete. The popped corn will be colored uniformly with very few kernels having areas that are partially white.

I claim:

1. An improved popcorn premix package comprising a closed container, means defining a plurality of compartments in the container, and a popcorn premix of popcorn, solidified fat, and a plurality of coloring agents dispersed in the solidified fat in the compartments of the container said coloring agents being distributed to impart a different color to the premix in each compartment.

2. A popcorn premix package containing popcorn and a solidified fat matrix having a coloring agent dispersed in the fat comprising a metal container, at least one vertical partition in the container dividing the container into a plurality of compartments, and a popcorn, fat, and dispersed coloring agent premix in the compartments, and with a plurality of coloring agents distributed among and imparting a plurality of colors to the plurality of compartments.

3. A premix package containing popcorn and a solidified fat matrix having a plurality of coloring agents dispersed in the fat matrix comprising a metal container, a plurality of substantially vertical partitions in the container dividing the container into at least three compartments, and a popcorn, fat, and dispersed coloring agent premix in the compartments, with a plurality of coloring agents distributed among and imparting a plurality of colors to the plurality of compartments.

4. A popcorn premix package comprising a closed container, a partition dividing the container into a plurality of compartments, a first compartment containing a popcorn and fat premix having a dispersed coloring agent therein, and a second compartment containing a popcorn and fat premix having a dispersed coloring agent therein, the coloring agent in the first compartment being a different color than the coloring agent in the second compartment.

5. The package of claim 4 wherein the fat has a melting point of between room temperature and 120° F.

6. The package of claim 4 wherein the fat has a melting point of between 95° F. and 101° F.

7. The package of claim 4 wherein the coloring agent is an oil dispersible lake.

8. The package of claim 7 wherein the lake is added in proportions of between 0.01 and 0.325% by weight of the popcorn-fat matrix.

9. A method of forming a popcorn premix package which produces multiple colored popped corn comprising dispersing a first coloring agent in a liquefied fat, combining the fat and first coloring agent with popcorn kernels, and adding the combined material to a first compartment of a container; dispersing a second coloring agent of a different color than said first coloring agent in a liquefied fat; combining fat and second coloring agent with popcorn kernels, and adding the combined material having the second coloring agent to a second compartment of the container; and cooling the combined popcorn, fat, and coloring agents to form solidified matrixes.

References Cited

UNITED STATES PATENTS

| | | | |
|---|---|---|---|
| Re. 20,057 | 6/1933 | Alexander | 220—PI |
| 2,604,407 | 7/1952 | Martin | 99—153 |
| 2,673,806 | 3/1954 | Colman | 99—171 |
| 2,815,883 | 12/1957 | Robins et al. | 220—66 |
| 2,951,610 | 9/1960 | Smalley, Jr. | 220—20 |
| 3,038,807 | 6/1962 | Cathcart et al. | 99—81X |

FRANK W. LUTTER, Primary Examiner

W. L. MENTLIK, Assistant Examiner

U.S. Cl. X.R.

99—83, 153